(12) United States Patent
Nakahira et al.

(10) Patent No.: US 11,346,471 B2
(45) Date of Patent: May 31, 2022

(54) CORRUGATED TUBE AND METHOD FOR MANUFACTURING SAME

(71) Applicant: NITTA CORPORATION, Osaka (JP)

(72) Inventors: Yuto Nakahira, Nabari (JP); Motoki Yamazaki, Nabari (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 16/979,502

(22) PCT Filed: Mar. 6, 2019

(86) PCT No.: PCT/JP2019/008747
§ 371 (c)(1),
(2) Date: Sep. 9, 2020

(87) PCT Pub. No.: WO2019/188059
PCT Pub. Date: Oct. 3, 2019

(65) Prior Publication Data
US 2021/0041044 A1  Feb. 11, 2021

(30) Foreign Application Priority Data

Mar. 28, 2018 (JP) .............................. JP2018-062116

(51) Int. Cl.
*F16L 11/11* (2006.01)
*F16L 11/15* (2006.01)
(Continued)

(52) U.S. Cl.
CPC .......... *F16L 11/15* (2013.01); *B29C 48/0019* (2019.02); *B29C 48/09* (2019.02);
(Continued)

(58) Field of Classification Search
CPC ... B60R 16/02; B60R 16/0215; B60R 16/027; H01B 7/00; F16L 11/11
(Continued)

(56) References Cited

U.S. PATENT DOCUMENTS 3,847,184 A * 11/1974 God ........................ F16L 11/15
138/120
6,521,155 B1 2/2003 Wunsch
(Continued)

FOREIGN PATENT DOCUMENTS

JP 52029618 A 3/1977
JP 1983072925 U 5/1983
(Continued)

*Primary Examiner* — Patrick F Brinson
(74) *Attorney, Agent, or Firm* — Muncy, Geissler, Olds & Lowe, P.C.

(57) ABSTRACT

The present invention provides a corrugated tube and a method for manufacturing the same capable of improving workability in press-fitting work of a pipe or a quick connector. A corrugated tube includes a flexible section having a first corrugated section and a second corrugated section, and straight sections integrally formed at both ends of the flexible section respectively. A length of valley portions in an axial center direction is larger than a length of valley portions in the first corrugated section, thereby allows a pitch P2 of mountain portions in the second corrugated section provided between the straight section and the first corrugated section to be larger than a pitch P1 of mountain portions in the first corrugated section.

5 Claims, 5 Drawing Sheets

(51) Int. Cl.
*B29C 48/09* (2019.01)
*B29C 48/13* (2019.01)
*B29C 48/00* (2019.01)
*B29C 53/30* (2006.01)

(52) U.S. Cl.
CPC .............. *B29C 48/13* (2019.02); *B29C 53/30* (2013.01); *F16L 11/11* (2013.01)

(58) Field of Classification Search
USPC .......................................... 138/121, 122, 118
See application file for complete search history.

(56) References Cited

U.S. PATENT DOCUMENTS

| | | | |
|---|---|---|---|
| 7,077,166 B2 * | 7/2006 | Heo ....................... | F16L 11/111 138/118 |
| 8,230,885 B2 * | 7/2012 | Krauss ..................... | F16L 11/11 138/121 |
| 9,692,216 B2 * | 6/2017 | Sugimoto ............... | B29C 48/09 |
| 9,925,934 B2 * | 3/2018 | Mochizuki .......... | B60R 16/0215 |
| 2014/0110012 A1 * | 4/2014 | Omura ................ | B60R 16/0215 138/121 |
| 2015/0294764 A1 * | 10/2015 | Adachi ................... | H01B 7/04 174/113 R |

FOREIGN PATENT DOCUMENTS

| | | |
|---|---|---|
| JP | 63106985 U | 7/1988 |
| JP | 2001516004 A | 9/2001 |
| JP | 2007060781 A | 3/2007 |
| JP | 2010260241 A | 11/2010 |
| JP | 2014025559 A | 2/2014 |
| JP | 2014128050 A | 7/2014 |
| JP | 2015228759 A | 12/2015 |

* cited by examiner

CORRUGATED TUBE AND METHOD FOR MANUFACTURING SAME

TECHNICAL FIELD

The present invention relates to a corrugated tube and a method for manufacturing the same.

BACKGROUND ART

A corrugated tube made of resin and capable of being freely bent so as to be used for piping in a desired route and a desired shape is known. The corrugated tube is used for protection of wiring, for a filler pipe, and so on. As the corrugated tube used for the filler pipe, for example, there is a tube including a flexible section capable of being freely bent and straight-tubular shaped straight sections formed at both ends of the flexible section and hardly bending. The flexible section is formed in a bellows shape in which convex mountain portions and concave valley portions having an annular shape along a circumferential direction are alternately arranged side by side, so as to be freely bent. Pipes for a fuel tank, an oil filling port and so on are connected to the straight sections. It is common that a pipe or a quick connector connected to the pipe is press-fitted to the straight section for the above connection (refer to, for example, Patent Literature 1).

CITATION LIST

Patent Literature

Patent Literature 1: JP-A-2010-260241

SUMMARY OF INVENTION

Technical Problem

In the case where the pipe or the quick connector is press-fitted to the straight section of the above corrugated tube, it is necessary to apply a force to an axial center direction of the corrugated tube. In this case, if the direction of the applied force deviates from the axial center direction when the press fitting is performed while holding the flexible section because of a limited working space or the like, it may be difficult to perform the press fitting due to bending of the flexible section. There is also a case where the flexible section is buckled and broken as a large force is necessary for press fitting. On the other hand, when a sufficiently large force is not applied, the press fitting of the pipe or the quick connector is imperfectly performed, which causes liquid leakage or falling-off.

The present invention has been made in view of the above circumstances, and an object thereof is to provide a corrugated tube and a method for manufacturing the same capable of improving workability in press-fitting work of the pipe or the quick connector.

Solution to Problem

In a corrugated tube including a flexible section and a straight-tubular shaped straight section at one end of the flexible section according to the present invention, the flexible section includes a bellows-shaped first corrugated section in which a plurality of mountain portions are formed at a first pitch and a bellows-shaped second corrugated section provided between the first corrugated section and the straight section, in the second corrugated section a plurality of mountain portions are formed at a second pitch larger than the first pitch, and a length in an axial center direction of the mountain portions in the second corrugated section is the same as a length in the axial center direction of the mountain portions in the first corrugated section, and a length in the axial center direction of valley portions in the second corrugated section is larger than a length in the axial center direction of valley portions in the first corrugated section.

A method for manufacturing a corrugated tube according to the present invention includes supplying a tubular-shaped molding material vertically downward while a supply amount per unit time is fixed and bringing the molding material into molds provided with straight section molding surfaces for forming a straight-tubular shaped straight section, first corrugated section molding surfaces for molding a bellows-shaped first corrugated section in which plural mountain portions are arranged at a first pitch, and second corrugated section molding surfaces for molding a bellows-shaped second corrugated section in which plural mountain portions are arranged at a second pitch larger than the first pitch on inner peripheral surfaces of the molds in order of the straight section molding surfaces, the second corrugated section molding surfaces and the first corrugated section molding surfaces along a moving direction, and performing molding while moving the molds vertically downward at a fixed speed.

Advantageous Effects of Invention

According to the present invention, the second corrugated section in which the pitch of the mountain portions is larger than that in the first corrugated section is provided between the first corrugated section and the straight section; therefore, the second corrugated section with higher flexural rigidity can be utilized in addition to the straight section at the time of press-fitting a pipe or a quick connector into the straight section. Accordingly, workability at the time of press-fitting the pipe or the quick connector into the straight section can be improved. Furthermore, the second corrugated section has flexibility, which allows the corrugated tube to be used for piping in a desired route and shape.

DESCRIPTION OF EMBODIMENTS

Figure 1:
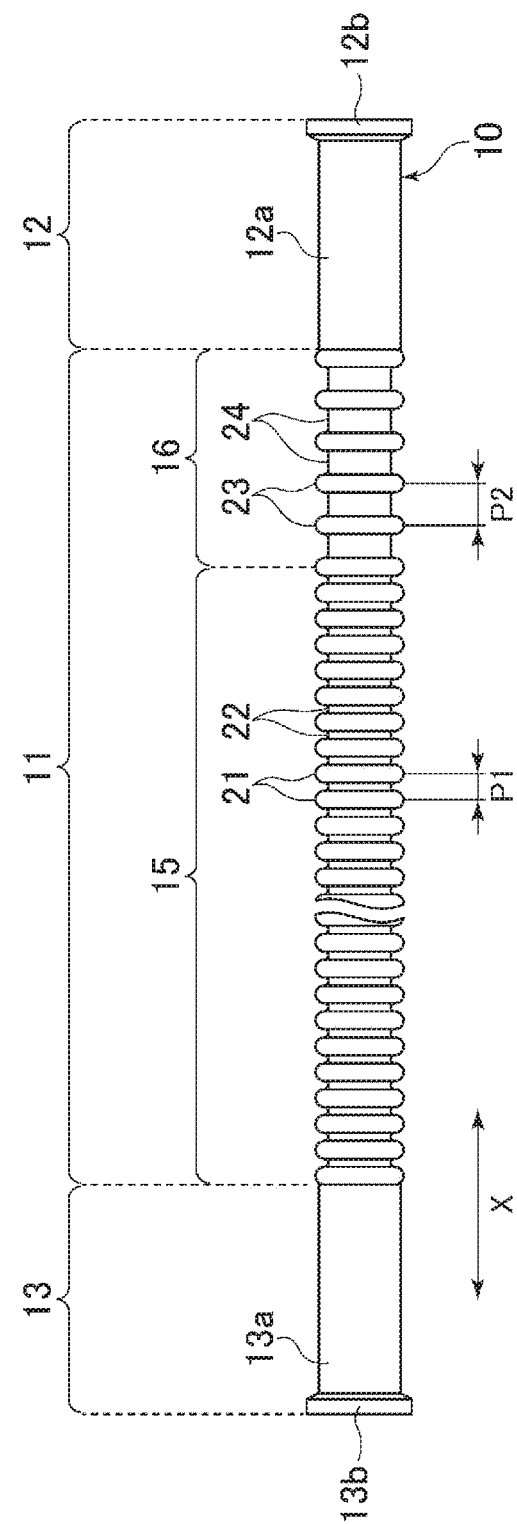
FIG. 1 is a plan view showing a corrugated tube according to an embodiment.

In FIG. 1, a corrugated tube 10 is used for, for example, a filler pipe, including a flexible section 11 having flexibility and straight sections 12, 13 integrally formed at both ends of the flexible section 11. The flexible section 11 consists of a first corrugated section 15 and a second corrugated section 16. The second corrugated section 16 is integrally formed at one end of the first corrugated section 15, and the straight section 13 is integrally formed at the other end of the first corrugated section 15. The straight section 12 is integrally formed at one end of the second corrugated section 16 on the opposite side of the first corrugated section 15. Accordingly, the second corrugated section 16 is provided between the first corrugated section 15 and the straight section 12.

Press fitting of a quick connector or a pipe into the straight section 12 is presumed to be performed in the corrugated tube 10 in this example; therefore, the second corrugated section 16 is provided only on the straight section 12 side of the flexible section 11. The second corrugated section 16 may be provided also between the first corrugated section 15 and the straight section 13.

The first corrugated section 15 is formed in a bellows shape in which convex mountain portions 21 formed in an annular shape along a circumferential direction of the corrugated tube 10 and concave valley portions 22 also formed in the annular shape are arranged alternately and continuously in an axial center direction (an arrow X direction) of the corrugated tube 10. The second corrugated section 16 is formed in a bellows shape in which convex mountain portions 23 and concave valley portions 24 formed in the annular shape in the same manner as the first corrugated section 15 are arranged alternately and continuously in the axial center direction of the corrugated tube 10. The mountain portions 21, 23 of the first corrugated section 15 and the second corrugated section 16 have the same shape as one another other including outer diameters. The valley portions 22 in the first corrugated section 15 and the valley portions 24 in the second corrugated section 16 have the same outer diameter.

In the first corrugated section 15, the mountain portions 21 are formed at a pitch P1 (first pitch). In the second corrugated section 16, the mountain portions 23 are formed at a pitch P2 (second pitch) larger than the pitch P1 for making the second corrugated section 16 hard to be bent as compared with the first corrugated section 15. In this example, the pitch P2 in the second corrugated section 16 is made to be larger than the pitch P1 in the first corrugated section 15 by making a length in the axial center direction of the valley portion 24 in the second corrugated section 16 larger than a length of the valley portion 22 in the first corrugated section 15. For example, the first corrugated section 15 is configured so that each valley portion 22 has an approximately U-shape in cross section, a length of a flat bottom is "0" mm, and the pitch P1 of the mountain portions 22 is 3 mm. Whereas in the second corrugated section 16, a length of a flat bottom of each valley portion 24 is 2 mm and the pitch P2 of the mountain portions is 5 mm.

The straight sections 12, 13 have a straight-tubular shape with no mountain portion and valley portion. Accordingly, the straight sections 12, 13 are portions that are hard to be bent. The straight sections 12, 13 respectively have flanges 12b, 13b integrally formed at end parts of straight body sections 12a, 13a having a straight-tubular shape. In this example, an outer diameter of the straight body sections 12a, 13a is smaller than the outer diameter of the mountain portions 21, 23 and larger than the outer diameter of the valley portions 22, 24.

In the corrugated tube 10 having the above structure, the second corrugated section 16 is configured so that the pitch P2 of the mountain portions 23 is larger than the pitch P1 of the mountain portion 21 in the first corrugated section 15 by making the length in the axial center direction of the valley portion 24 larger. Accordingly, the second corrugated section 16 has a high flexural rigidity as compared with the first corrugated section 15.

In the corrugated tube 10, as the second corrugated section 16 has a proper flexural rigidity, it is also possible to apply a force of pressing the quick connector into the straight section 12 while holding the second corrugated section 16, not the straight section 12, for example, at the time of connecting the quick connector (or the pipe) to the straight section 12. Even when the same connecting work is performed while holding the first corrugated section 15 or the straight section 13, since the second corrugated section 16 is provided, a portion having the high flexural rigidity combined with the straight section 12 is made to be long; therefore, the applied force is not easily deviated in a direction of bending the flexible section 11. As described above, the corrugated tube 10 can perform press-fitting work to the quick connector easily, which improves workability. Additionally, the second corrugated section 16 has a proper flexibility, which allows the corrugated tube 10 to be used for piping in a desired route and shape.

Figure 2:
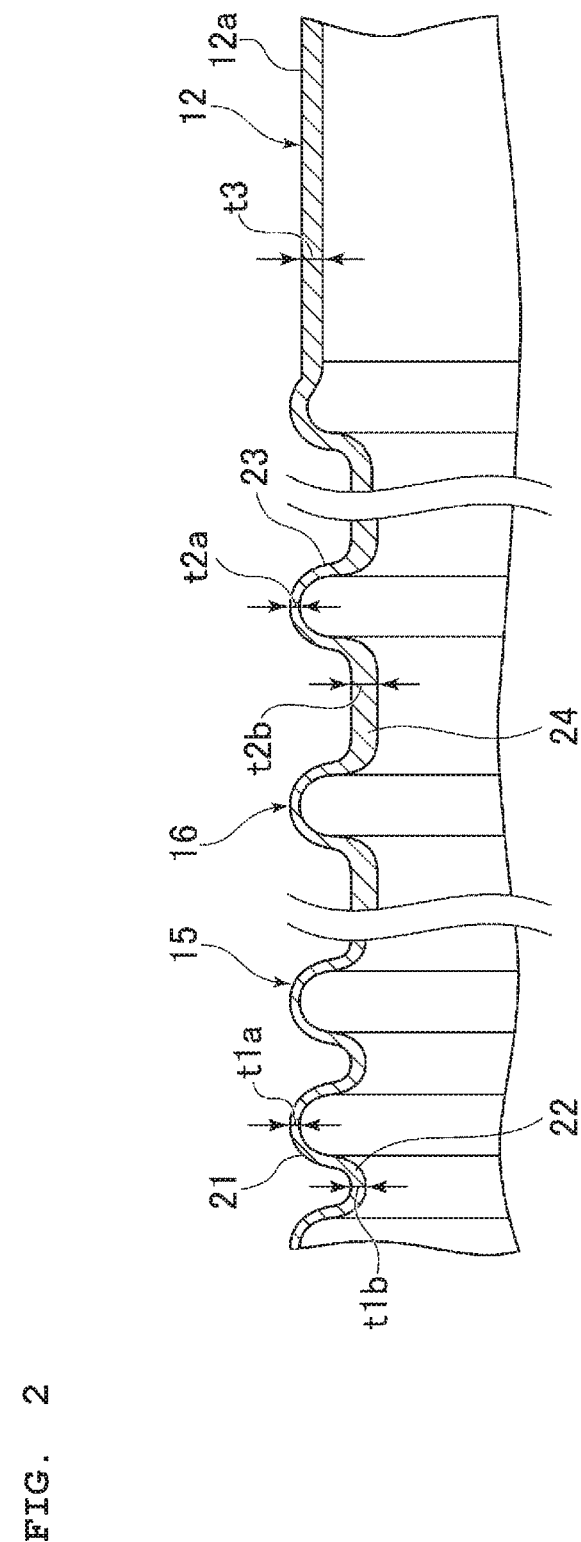
FIG. 2 is a cross-sectional view showing a cross section of the corrugated tube.

The high flexural rigidity in the second corrugated section 16 can be obtained also due to a fact that a wall thickness (thickness of a pipe wall) of the second corrugated section 16 is larger than a wall thickness of the first corrugated section 15. This point will be explained below. As shown in FIG. 2, a wall thickness of the mountain portion 21 in the first corrugated section 15 is t1$a$, a wall thickness of the valley portion 22 is t1$b$, a wall thickness of the mountain portion 23 in the second corrugated section 16 is t2$a$, and a wall thickness of the valley portion 24 is t2$b$. The wall thicknesses t1$a$, t2$a$ are thicknesses at apex parts of the mountain portions 21, 23, and the wall thicknesses t1$b$, t2$b$ are thicknesses at bottoms (portions with the minimum diameter) of the valley portions 22, 24.

In a case where the corrugated tube 10 is fabricated by a later-described corrugator, the larger the pitch of the mountain portions 21, 23 is, the smaller a surface area per unit length becomes; therefore, the wall thicknesses t1$b$, t2$b$ of the valley portions 22, 24 particularly tend to be large. The pitch P2 in the second corrugated section 16 is larger than the pitch P1 in the first corrugated section 15 as described above, the wall thickness t2$b$ of the valley portion 24 in the second corrugated section 16 is larger than the wall thickness t1$b$ of the valley portion 22 in the first corrugated section 15. Accordingly, the flexural rigidity of the second corrugated section 16 becomes larger than that of the first corrugated section 15. Note that there is not much difference due to the pitch between the wall thicknesses t1$a$ and t2$a$ of the mountain portions 21, 23.

When comparing the size of the wall thicknesses t1$b$, t2$b$ in the valley portions 22, 24, the wall thickness t1$b$ is preferably a wall thickness of the valley portion 22 adjacent to the second corrugated section 16, and the wall thickness t2$b$ is preferably a wall thickness of the valley portion 24 adjacent to the first corrugated section 15. In a case where the valley portions extend in the axial center direction of the corrugated tube 10 as in the second corrugated section 16, for example, a wall thickness at a central position of the valley portion having the smallest influence of mountain portions on both sides is preferably used.

Figure 3:
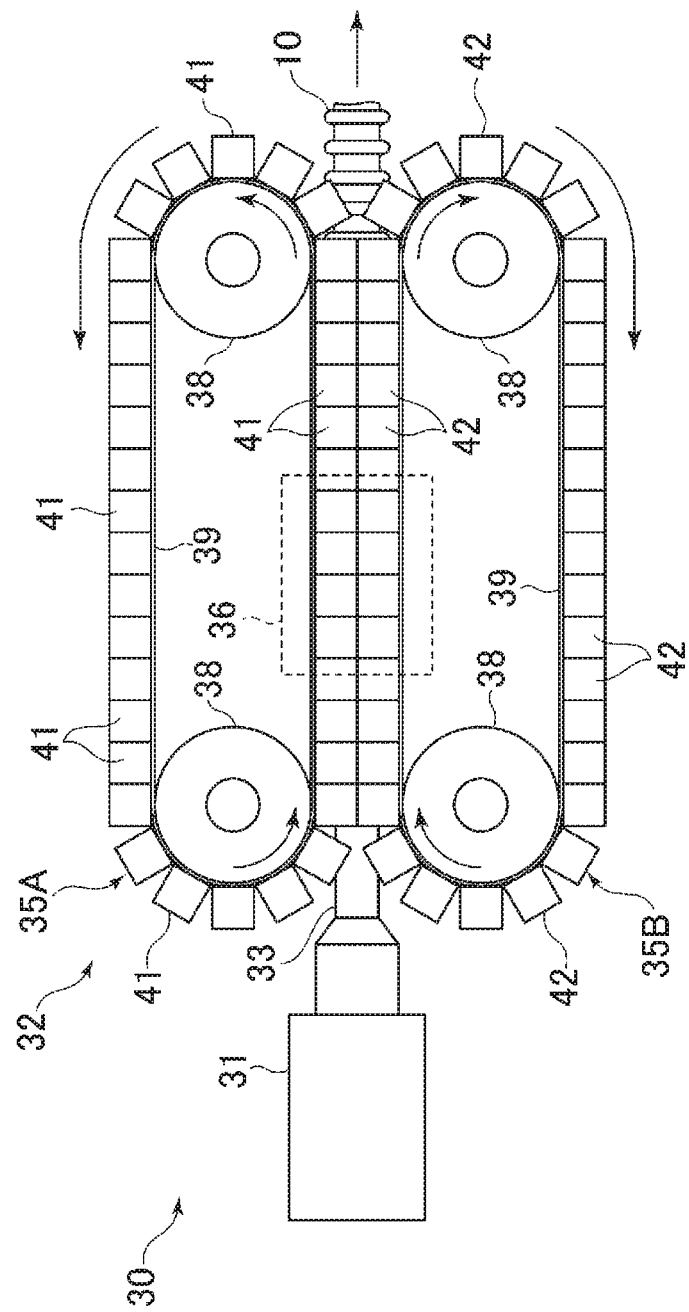
FIG. 3 is an explanatory view schematically showing a structure of a corrugator.

A corrugator 30 for manufacturing the corrugated tube 10 is schematically shown in FIG. 3. The corrugator 30 includes an extruder 31, a molding section 32, and so on. The extruder 31 feeds a molding material 33 and supplies the material to the molding section 32. The molding material 33, which is a thermoplastic resin, is heated, softened, and extruded in a tubular shape by the extruder 31. A feeding speed of the molding material 33 by the extruder 31 is fixed, namely, a supply amount of the molding material 33 per unit time is fixed.

The molding section 32 includes a pair of mold units 35A, 35B, and a vacuum suction mechanism 36. The mold unit 35A includes a pair of pulleys 38, an endless belt 39 wound around these pulleys 38, a plurality of split molds 41 forming the mold, a motor (not shown) driving the endless belt 39 to travel in a direction of an arrow in the drawing through the pulleys 38, and so on. The split molds 41 are continuously attached on an outer peripheral surface of the endless belt 39 along the travelling direction. The mold unit 35B also has the same structure as the mold unit 35A, including the pair of pulleys 38, the endless belt 39, a plurality of split molds 42, a motor (not shown) driving the endless belt 39 to travel, and so on. The split molds 42 are continuously attached on an outer peripheral surface of the endless belt 39.

The mold units 35A, 35B are driven so that the split molds 41 and the split molds 42 circularly travel in directions different from each other. Accordingly, the split molds 41, 42 are abutted with each other so as to correspond to each other at a confluent part near the extruder 31. The split molds 41, 42 move downstream (toward a right side in FIG. 3) in the abutted state, and are opened at a dividing part, and then move toward the confluent part. The mold units 35A, 35B are driven so that the split molds 41, 42 move at the same speed as each other while maintaining a fixed speed.

On surfaces on an outer peripheral side of the respective split molds 41, 42, molding surfaces (not shown) corresponding to shapes on an outer peripheral surface of the corrugated tube 10 are formed. The molding surfaces formed by dividing the shapes on the outer peripheral surface of the corrugated tube 10 into plural surfaces along the axial center direction thereof are assigned to the respective split molds 41, 42. Accordingly, there are the split molds 41, 42 having molding surfaces corresponding to the shape of the straight section 12 (straight section molding surfaces), the split molds 41, having molding surfaces corresponding to the second corrugated section 16 (second corrugated section molding surfaces), the split molds 41, 42 having molding surfaces corresponding to the first corrugated section 15 (first corrugated section molding surfaces), and the split molds 41, 42 having molding surfaces corresponding to the shape of the straight section 13. In the corrugator 30, the split molds 41, 42 are arranged so that one corrugated tube 10 is molded in order of the straight section 12, the second corrugated section 16, the first corrugated section 15, and the straight section 13.

On the molding surfaces corresponding to the first corrugated section 15, semi-annular shaped concave parts corresponding to the mountain portions 21 are formed at the pitch P1. On the molding surfaces corresponding to the second corrugated section 16, semi-annular shaped concave parts corresponding to the mountain portions 23 are formed at the pitch P2. On the molding surfaces corresponding to the first corrugated section 15 and the second corrugated section 16, semi-annular shaped convex parts corresponding to the valley portions 22, 24 are formed, in which convex parts corresponding to the valley portions 24 have a larger length than convex parts corresponding to the valley portions 22 in the axial center direction of the corrugated tube 10 (a moving direction of the split molds 41, 42).

Hollow parts surrounded by the molding surfaces for molding the corrugated tube 10 are formed inside the abutted split molds 41, 42 as described above. At the time of being abutted with each other as described above, the split molds 41, 42 bring the molding material 33 from the extruder 31 into the hollow parts thereof and move downstream. When the split molds 41, 42 bringing the molding material 33 into the hollow parts move to a position of the vacuum suction mechanism 36, suction is performed from suction ports (not shown) provided in the split molds 41, 42 by the vacuum suction mechanism 36. Accordingly, the tubular-shaped molding material 33 closely contact the molding surfaces of the split molds 41, 42 and is molded into tubular shapes corresponding to the molding surfaces. After the molding material 33 is hardened, the split molds 41, 42 are opened at the dividing part, where molded portions are taken out from the inside of the molds.

A process of bringing the molding material 33 into the hollow parts of the split molds 41, 42 to a process of taking out the molded portions are continuously performed, and the split molds 41, 42 circularly travel, thereby continuously fabricate a plurality of corrugated tubes 10 in a state where end parts thereof are connected to one another. The plural corrugated tubes 10 are separated to respective corrugated tubes 10 at respective end parts.

In the case where the molding material 33 is supplied to the mold units 35A, 35B in which the moving speeds of the split molds 41, 42 are fixed while the supply amount per unit time is fixed as described above, a supply amount of the molding material 33 per unit length of the corrugated tube 10 to be fabricated is fixed. The unit length is a length in the axial center direction of the corrugated tube 10. Accordingly, the smaller the surface area of the corresponding first corrugated section 15 or the second corrugated section 16 per unit length is, the larger the wall thicknesses t1$b$, t2$b$ of the valley portions 22 in the first corrugated section 15 and the valley portions 24 in the second corrugated section 16 in the axial center direction of the corrugated tube 10 fabricated by the corrugator 30 become. The larger the pitch of the mountain portions 21, 23 is, the smaller the surface area per unit length becomes. Therefore, as described above, the pitch P2 of the valley portions 23 in the second corrugated section 16 is made to be larger than the pitch P1 of the valley portions 21 in the first corrugated section 15, thereby reducing the surface area of the second corrugated section 16 per unit length as compared with that of the first corrugated section 15, as a result, the wall thickness t2$b$ of the valley portion 24 in the second corrugated section 16 becomes larger than the wall thickness t1$b$ of the valley portion 22 in the first corrugated section 15.

The corrugated tube 10 provided with the second corrugated section 16 as described above also has an effect of restraining deterioration in pressure resistance due to thinning of wall thickness in the flexible section caused by resin sagging occurring in a manufacturing process. The effect of restraining the deterioration in pressure resistance will be explained below.

The reduction in wall thickness in the flexible section caused by the resin sagging in the corrugated tube 10 occurs when a vertical corrugator is used. The vertical corrugator feeds the molding material downward (vertically downward) by the extruder and performs molding while corresponding split molds move downward in the state of being abutted with each other. Other structures of the vertical corrugator are the same as those of the corrugator 30 shown in FIG. 3; therefore, these are not shown.

When the corrugated tube 10 is fabricated by the vertical corrugator, any of the straight sections, that is, the straight section 12 in this example is formed prior to the flexible section 11, and the straight section 12 is positioned below the flexible section 11. The molded molding material 33 sags downward due to gravity until the material is completely hardened. An amount of sagging of the molding material 33 is higher on an inner peripheral surface of the straight section 12 where unevenness is not formed on the inner peripheral surface than on an inner peripheral surface of the flexible section 11. As a result, part of the molding material 33 on the inner peripheral surface of the flexible section 11 moves downward by being dragged by sagging at an unhardened portion of the molding material 33 on the inner peripheral surface of the straight section 12, and a wall thickness at that part in the flexible section 11 is decreased. Accordingly, the thinning of wall thickness in the flexible section 11 caused by the resin sagging occurs.

In the case where the corrugated tube 10 is fabricated by the vertical corrugator, the wall thickness $t2b$ of the valley portion 24 in the second corrugated section 16 becomes larger than the wall thickness $t1b$ of the valley portion 22 in the first corrugated section 15, and there is not much difference due to the pitch in the wall thicknesses $t1a$, $t2a$ of the mountain portions 21, 23. In the second corrugated section 16, the wall thicknesses $t2a$, $t2b$ tend to be smaller as coming close to the straight section 12.

In a related-art corrugated tube, the wall thickness of the flexible section at a portion close to the straight section becomes smaller as compared with other portions of the flexible section due to the thinning of wall thickness of the flexible section caused by the resin sagging as described above, which deteriorates pressure resistance at the portion. In such a related-art corrugated tube, pressure resistance of the corrugated tube is determined by pressure resistance at the portion of the flexible section where the wall thickness is decreased due to the resin sagging.

Concerning the above, part of the molding material 33 on the inner peripheral surface of the second corrugated section 16 moves downward and the wall thickness of the second corrugated section 16 is decreased due to the resin sagging also in the corrugated tube 10 in this example. However, it is possible to allow the wall thickness of the second corrugated section 16 to be the same as or larger than the wall thickness of the first corrugated section 15 even when the above resin sagging occurs by suitably adjusting the pitch P2 of the mountain portions 23. More specifically, the wall thickness $t2b$ of the valley portion 24 in the second corrugated section 16 can be the same as or larger than the wall thickness $t1b$ of the valley portion 22 in the first corrugated section 15.

Accordingly, when the pitch of the mountain portions in the related-art corrugated tube is the same as the pitch P1 of the mountain portions 21 in the first corrugated section 15, the wall thickness $t2b$ of the valley portion 24 in the second corrugated section 16 is larger than the wall thickness of the valley portion that is thinned in thickness due to the resin sagging in the related-art corrugated tube. The wall thickness $t1b$ of the valley portion 22 in the first corrugated section 15 is larger than the wall thickness of the valley portion that is thinned in thickness due to the resin sagging in the related-art corrugated tube because thinning of wall thickness due to the resin sagging does not occur. As a result, the pressure resistance of the flexible section 11 including the second corrugated section 16 where the wall thickness is thinned due to the resin sagging is improved in the corrugated tube 10 as compared with that of the related-art corrugated tube.

When an internal pressure was applied to the corrugated tube 10 fabricated by the vertical corrugator in which the wall thickness $t2a$ of the mountain portion 23 is the minimum among the mountain portions 21, 23 and the valley portions 22, 24, a burst point was in the first corrugated section 15. It can be considered that the increased wall thickness of the valley portion 24 in the second corrugated section 16 contributes to improvement of pressure resistance.

The shape of the corrugated tube, the numbers of mountain portions, the pitches and so on in respective corrugated sections described above are examples and are not limited to the above. In the corrugated tube 10 shown in FIG. 4, a length of a second corrugated section 16A is shorter than that shown in FIG. 1, and the first corrugated section 15 is elongated correspondingly, thereby making the entire length of the corrugated tube 10 the same as that of FIG. 1. The number of the mountain portions 23 in the second corrugated section 16A (including the one on a boundary with respect to the first corrugated section 15 and the one on a boundary with respect to the straight section 12) is three, and a pitch P3 (second pitch) of the mountain portions 23 is, for example, 4.7 mm. By making the pitch P3 of the mountain portions 23 in the second corrugated section 16A larger than the pitch P1 of the mountain portions 21 in the first corrugated section 15, the wall thickness $t2b$ of the valley portion 24 in the second corrugated section 16A is made to the same as or larger than the wall thickness $t1b$ of the valley portion 22 in the first corrugated section 15.

EXAMPLES

Corrugated tubes each having the second corrugated section were fabricated by using the vertical corrugator and effects were checked as Examples 1 to 10. The effects with respect to the thinning of wall thickness reduction in the flexible section caused by the resin sagging were achieved by having the second corrugated section. In Examples 1 to 10, a plurality of corrugated tubes were respectively fabricated, and burst pressures for three corrugated tubes selected at random from the fabricated plural corrugated tubes were respectively measured.

In Examples 1 to 3, the plural corrugated tubes 10 respectively having a shape shown in FIG. 1 (hereinafter, referred to as a shape A) were fabricated. At the time of the fabrication, the corrugator 30 was adjusted so that a wall thickness to be a target (hereinafter, referred to as a target wall thickness) of the straight body section $12a$ was set to 1.03 mm. Difference between Examples 1 to 3 is the difference in production lot of the corrugated tubes 10 to be measured.

In the shape A, the six mountain portions 23 were formed in the second corrugated section 16. The six mountain portions 23 in the second corrugated section 16 include the two mountain portions 23 at a boundary part between the first corrugated section 15 and the second corrugated section 16 and a boundary part between the second corrugated section 16 and the straight section 12. The pitch P1 of the mountain portions 21 in the first corrugated section 15 was set to 3 mm and the pitch P2 of the mountain portions 23 in the second corrugated section 16 was set to 5 mm in the shape A. Each valley portion 22 in the first corrugated section 15 had a substantial U-shape in cross section and a length of a flat bottom was "0" mm and a length of a flat bottom of each valley portion 24 in the second corrugated section 16 was 2 mm.

In examples 4 to 6, the plural corrugated tubes 10 having the shape A were fabricated by respectively adjusting the corrugator 30 so that the target wall thickness of the straight body section $12a$ was 1.15 mm. Other conditions, dimensions of the shape and so on are the same as those in Examples 1 to 3. Difference between Examples 4 to 6 is the difference in production lot of the corrugated tubes 10 to be measured.

Figure 4:
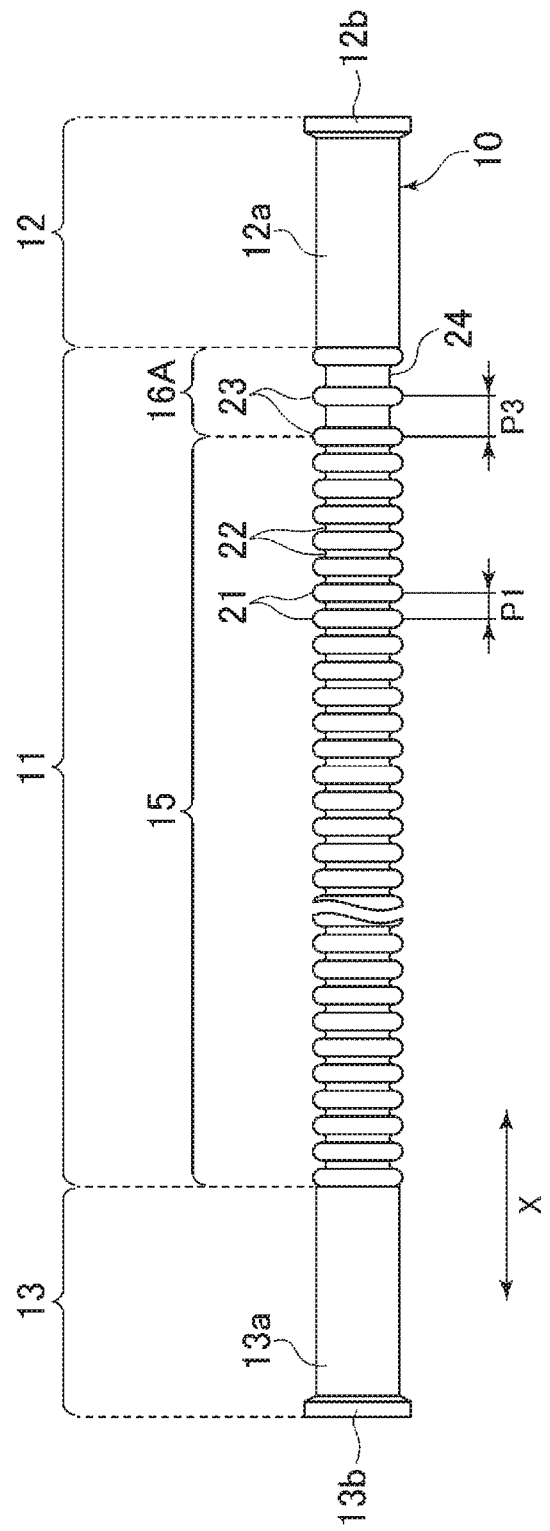
FIG. 4 is a plan view showing a corrugated tube having a second corrugated section in which mountain portions are formed at a different pitch.

In examples 7, 8, the plural corrugated tubes 10 respectively having a shape shown in FIG. 4 (hereinafter, referred to a shape B) were fabricated. At the time of fabrication, the corrugator 30 was adjusted so that the target wall thickness of the straight body section 12a was set to 1.03 mm. Difference between Examples 7, 8 is the difference in production lot of the corrugated tubes 10 to be measured.

In the shape B, the three mountain portions 23 were formed in the second corrugated section 16A. The three mountain portions 23 in the second corrugated section 16A include the two mountain portions 23 at boundary parts with respect to the first corrugated section 15 and the straight section 12. The first corrugated section 15 in the shape B has the same shape as the shape A, and the pitch P3 of the mountain portions 23 in the second corrugated section 16A was 4.7 mm and a bottom length of each valley portion 24 was 1.7 mm.

In examples 9, 10, the plural corrugated tubes 10 having the shape B were fabricated by respectively adjusting the corrugator 30 so that the target wall thickness of the straight body section 12a was 1.15 mm. Other conditions, dimensions of the shape and so on are the same as those in Examples 7, 8. Difference between Examples 9, 10 is the difference in production lot of the corrugated tubes 10 to be measured.

The shape and the length in the straight sections 12, 13 on both ends are the same and the entire length is also the same in the corrugated tubes 10 having the shape A in Examples 1 to 6 and in the corrugated tubes 10 having the shape B in Examples 7 to 10.

In the three corrugated tubes 10 in Examples 1 to 10, the wall thicknesses t2b of the valley portions 24 in the second corrugated sections 16, 16A were equal to or larger than the wall thickness t1b of the valley portions 22 in the first corrugated section 15, respectively.

As Comparative Examples 1, 2, a plurality of corrugated tubes having a shape (hereinafter, referred to a shape C) in which mountain portions were formed in the entire flexible section under the same conditions as the first corrugated section 15, and burst pressures for three corrugated tubes selected at random from the fabricated plural corrugated tubes were respectively measured. The target wall thickness of the straight section was set to 1.03 mm in Comparative Example 1, and the target wall thickness of the straight section was set to 1.15 mm in Comparative Example 2. The shape and the length in the straight sections on both ends are the same and the entire length is also the same in the corrugated tubes in Comparative Examples 1, 2 and in the corrugated tubes 10 in Examples 1 to 10.

In Examples 1 to 10 and Comparative Examples 1, 2, pressures obtained when an internal pressure was applied to respectively selected three corrugated tubes and the corrugated tubes were burst were measured as burst pressures. Average burst pressure ratios based on the measurement results are shown in Table 1. The average burst pressure ratio was calculated by calculating an average burst pressure as an average of burst pressures of three corrugated tubes with respect to each of Examples 1 to 10 and Comparative Examples 1, 2 to obtain a ratio of the average burst pressure of each of Examples 1 to 10 and Comparative Examples 1, 2 with respect to a reference set by using the average burst pressure of Comparative Example 1 as the reference (100%). Straight-section average wall thickness ratios are shown together in Table 1 for convenience as indexes for the wall thicknesses of the corrugated tubes in Examples 1 to 10 and Comparative Examples 1, 2. The straight-section average wall thickness ratio is a value obtained by measuring wall thicknesses of straight body sections at both ends of the selected three corrugated tubes, calculating an average value of the maximum values and an average value of the minimum values respectively, and averaging an average value of respective maximum values and an average value of respective minimum values of the straight body sections at both ends. Note that values in brackets in columns of the straight-section average wall thickness ratio and the average burst pressure ratio of Comparative Example 1 in FIG. 1 indicate the straight-section average wall thickness and the average burst pressure of Comparative Example 1.

Figure 5:
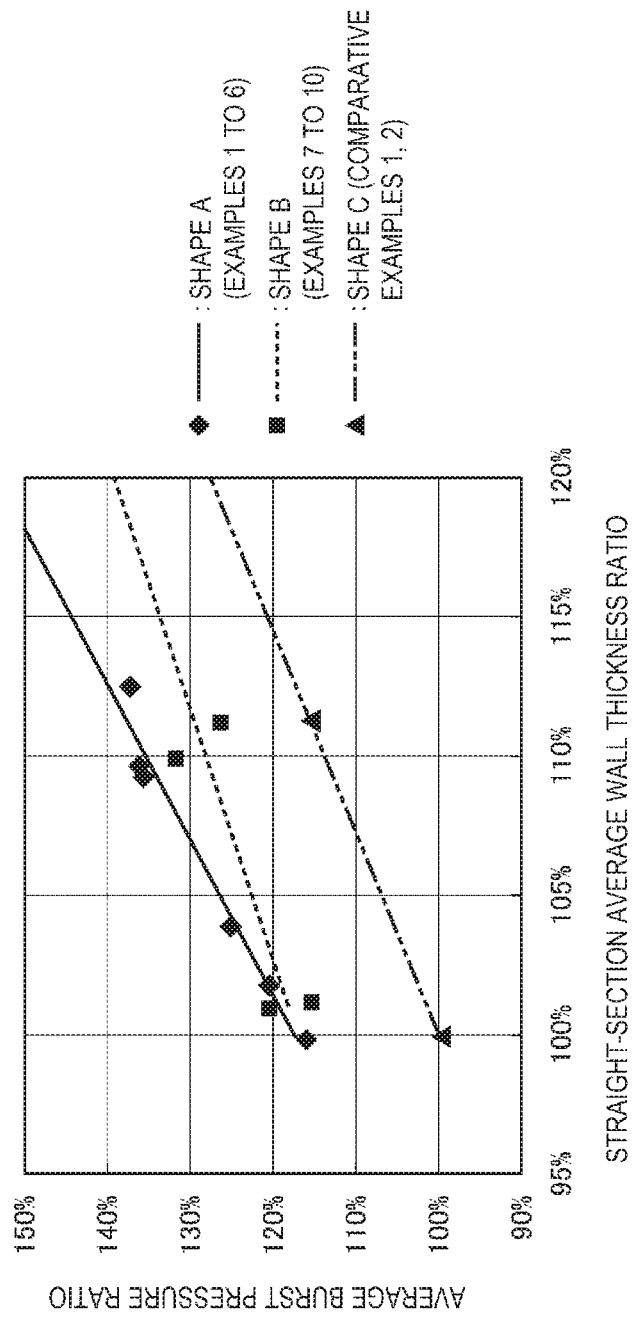
FIG. 5 is a graph showing the relation between straight-section average wall thickness ratios and average burst pressure ratios.

The relation between the straight-section average wall thickness ratios and the average burst pressure ratios is shown in FIG. 5. The straight-section average wall thickness ratio is a ratio of the straight-section average wall thickness with respect to a reference set by using the straight-section average wall thickness of Comparative Example 1 as the reference (100%).

TABLE 1

| | Shape | Straight section target wall thickness (mm) | Straight section average wall thickness ratio | Average burst pressure ratio |
|---|---|---|---|---|
| Example 1 | A | 1.03 | 104% | 125% |
| Example 2 | A | | 102% | 121% |
| Example 3 | A | | 100% | 116% |
| Example 4 | A | 1.15 | 113% | 137% |
| Example 5 | A | | 109% | 136% |
| Example 6 | A | | 110% | 136% |
| Example 7 | B | 1.03 | 101% | 121% |
| Example 8 | B | | 101% | 115% |
| Example 9 | B | 1.15 | 110% | 132% |
| Example 10 | B | | 111% | 126% |
| Comparative Example 1 | C | 1.03 | 100% (1.017 mm) | 100% (4.47 MPa) |
| Comparative Example 2 | C | 1.15 | 111% | 116% |

In a case where Examples 1 to 3 and Examples 7, 8 in which the target wall thickness of the straight body section 12a is 1.03 mm are compared with Comparative Example 1 in which the target wall thickness is also 1.03 mm, it is found that the burst pressure is obviously higher in the corrugated tubes 10 of Examples 1 to 3 and Examples 7, 8 in which the second corrugated section 16/16A is provided between the first corrugated section 15 and the straight section 12. In a case where Examples 4 to 6 and Examples 9, 10 in which the target wall thickness of the straight body section 12a is 1.15 mm are compared with Comparative Example 2 in which the target wall thickness is also 1.15 mm, it is found that the burst pressure is obviously higher in the corrugated tubes 10 of Examples 4 to 6 and Examples 9, 10 in which the second corrugated section 16A is provided between the first corrugated section 15 and the straight section 12. The burst occurred in the first corrugated section 15 in Examples 1 to 10, and the burst occurred in the flexible section near the boundary with respect to the straight section in Comparative Examples 1, 2.

Averages of the wall thicknesses t1a, t2a of respective mountain portions 21, 23 in the three corrugated tubes 10 having the shape A fabricated by using the vertical corrugator are shown as mountain portion wall thicknesses, and averages of the wall thicknesses t1b, t2b of the valley portions 22, 24 are shown as valley portion wall thicknesses respectively in Table 2. In Table 2, the mountain portions 21, 23 at respective positions are distinguished by mountain numbers, and the mountain numbers 1, 2, 3 . . . are given in order from the side of the straight section 12. Similarly, the valley portions 22, 24 at respective positions are distinguished by valley numbers, and the valley numbers 1.5, 2.5, 3.5 . . . are given in order from the side of the straight section 12. A mountain and valley average wall thickness shows an average of respective wall thicknesses of one valley portion and two mountain portions sandwiching the valley portion corresponding to a column where the value is written.

An average of wall thicknesses of the straight body sections 12a of the three corrugated tubes 10 was 1.007 mm. The wall thicknesses of the straight body sections 12a were measured at a position 10 mm apart from the boundary with respect to the flexible section 11. An average of the maximum value and the minimum value was calculated for one corrugated tube 10, and an average value for the three corrugated tubes 10 was obtained as the wall thicknesses of the straight body sections 12a.

TABLE 2

| | Mountain number | Mountain portion wall thickness (mm) | Valley number | Valley portion wall thickness (mm) | Mountain and valley average wall thickness (mm) |
|---|---|---|---|---|---|
| Second corrugated section | 1 | 0.802 | | | |
| | | | 1.5 | 1.115 | 0.869 |
| | 2 | 0.692 | | | |
| | | | 2.5 | 1.194 | 0.928 |
| | 3 | 0.898 | | | |
| | | | 3.5 | 1.267 | 1.037 |
| | 4 | 0.945 | | | |
| | | | 4.5 | 1.311 | 1.066 |
| | 5 | 0.942 | | | |
| | | | 5.5 | 1.325 | 1.060 |
| | 6 | 0.913 | | | |
| First corrugated section | | | 6.5 | 0.862 | 0.926 |
| | 7 | 1.003 | | | |
| | | | 7.5 | 0.832 | 0.915 |
| | 8 | 0.910 | | | |
| | | | 8.5 | 0.810 | 0.895 |
| | 9 | 0.965 | | | |
| | | | 9.5 | 0.824 | 0.901 |
| | 10 | 0.913 | | | |
| | | | 10.5 | 0.836 | |

(n = 3)

According to Table 2, it is found that the wall thicknesses t2b of the valley portions 24 in the second corrugated section 16 are equal to or larger than the wall thicknesses t1b of the valley portions 22 in the first corrugated section.

REFERENCE SIGNS LIST

10: corrugated tube
11: flexible section
12, 13: straight section
15: first corrugated section
16, 16A: second corrugated section
21, 23: mountain portion
22, 24: valley portion
30: corrugator

The invention claimed is:

1. A corrugated tube comprising:
a flexible section; and
a straight-tubular shaped straight section at one end of the flexible section,
wherein the flexible section includes a bellows-shaped first corrugated section in which a plurality of mountain portions are formed at a first pitch and a bellows-shaped second corrugated section provided between the first corrugated section and the straight section, in the second corrugated section a plurality of mountain portions are formed at a second pitch larger than the first pitch,
a length in an axial center direction of the mountain portions in the second corrugated section is the same as a length in the axial center direction of the mountain portions in the first corrugated section, and a length in the axial center direction of valley portions in the second corrugated section is larger than a length in the axial center direction of valley portions in the first corrugated section, and
a wall thickness of the valley portions in the second corrugated section is larger than that of the valley portions in the first corrugated section.

2. The corrugated tube according to claim 1, wherein the straight sections are respectively formed at both end parts of the flexible section, and
the second corrugated section is provided at least between the straight section at one end part and the first corrugated section.

3. A method for manufacturing a corrugated tube according to claim 1, comprising:
supplying a tubular-shaped molding material vertically downward while a supply amount per unit time is fixed;
bringing the molding material into molds provided with straight section molding surfaces for forming a straight-tubular shaped straight section, first corrugated section molding surfaces for molding a bellows-shaped first corrugated section in which plural mountain portions are arranged at a first pitch, and second corrugated section molding surfaces for molding a bellows-shaped second corrugated section in which plural mountain portions are arranged at a second pitch larger than the first pitch on inner peripheral surfaces of the molds in order of the straight section molding surfaces, the second corrugated section molding surfaces and the first corrugated section molding surfaces along a moving direction; and
performing molding while moving the molds vertically downward at a fixed speed.

4. The corrugated tube according to claim 1, wherein a wall thickness of the mountain portions in the second corrugated section is the same as that of the mountain portions in the first corrugated section.

5. The corrugated tube according to claim 1, wherein an outer diameter of the valley portions in the second corrugated section is the same as that of the valley portions in the first corrugated section.

* * * * *